(12) United States Patent
Antretter et al.

(10) Patent No.: US 11,543,113 B2
(45) Date of Patent: Jan. 3, 2023

(54) ARRANGEMENT FOR ILLUMINATING AND RECORDING A MOVING SCENE

(71) Applicant: OSRAM Opto Semiconductors GmbH, Regensburg (DE)

(72) Inventors: Marco Antretter, Parkstetten (DE); Mikko Perälä, Tampere (FI); Désirée Queren, Neutraubling (DE)

(73) Assignee: OSRAM OLED GmbH, Regensburg (DE)

( * ) Notice: Subject to any disclaimer, the term of this patent is extended or adjusted under 35 U.S.C. 154(b) by 611 days.

(21) Appl. No.: 16/480,556

(22) PCT Filed: Feb. 22, 2018

(86) PCT No.: PCT/EP2018/054388
§ 371 (c)(1),
(2) Date: Jul. 24, 2019

(87) PCT Pub. No.: WO2018/153987
PCT Pub. Date: Aug. 30, 2018

(65) Prior Publication Data
US 2020/0080715 A1    Mar. 12, 2020

(30) Foreign Application Priority Data
Feb. 24, 2017    (DE) .................... 10 2017 103 886.8

(51) Int. Cl.
*G09G 3/3233* (2016.01)
*F21V 23/04* (2006.01)

(52) U.S. Cl.
CPC ....... *F21V 23/0478* (2013.01); *G09G 3/3233* (2013.01); *G09G 2300/0809* (2013.01)

(58) Field of Classification Search
CPC .............. F21V 23/0478; G09G 3/3233; G09G 2300/0809; G06F 3/0421
See application file for complete search history.

(56) References Cited

U.S. PATENT DOCUMENTS

| | | |
|---|---|---|
| 8,483,557 B1 | 7/2013 | Yost et al. |
| 8,761,594 B1 | 6/2014 | Gross et al. |
| 9,192,021 B2 | 11/2015 | Häfner et al. |
| 9,362,335 B2 | 6/2016 | von Malm |
| 10,293,745 B2 | 5/2019 | Vargas Rivero et al. |
| 2004/0105264 A1 | 6/2004 | Spero |
| 2012/0189291 A1 | 7/2012 | von Malm et al. |

(Continued)

FOREIGN PATENT DOCUMENTS

| | | |
|---|---|---|
| DE | 10 2009 047788 | 3/2011 |
| DE | 10 2012 217 919 | 4/2014 |

(Continued)

*Primary Examiner* — Stacy Khoo
(74) *Attorney, Agent, or Firm* — DLA Piper LLP (US)

(57) ABSTRACT

An arrangement that illuminates and records a moving scene, including a light source that illuminates the moving scene, a control device that operates the light source, and a camera that records the moving scene, wherein the light source includes a plurality of pixels, each of which is configured to illuminate an area of the moving scene, the control device is configured to operate the pixels, and the light source includes at least one semiconductor component including at least one semiconductor chip containing two or more of the plurality of pixels.

23 Claims, 4 Drawing Sheets

(56) References Cited

U.S. PATENT DOCUMENTS

| | | | | |
|---|---|---|---|---|
| 2015/0014716 A1* | 1/2015 | von Malm | ............ | H01L 33/382 |
| | | | | 257/89 |
| 2015/0137701 A1* | 5/2015 | Siessegger | ............ | H05B 45/37 |
| | | | | 315/294 |
| 2016/0182891 A1 | 6/2016 | Ko et al. | | |
| 2017/0347073 A1* | 11/2017 | Shimizu | ................... | F21S 8/00 |

FOREIGN PATENT DOCUMENTS

| | | | | |
|---|---|---|---|---|
| DE | 11 2013 005 337 | | 7/2015 | |
| DE | 10 2015 012 416 | | 3/2017 | |
| DE | 10 2015 012 808 | | 4/2017 | |
| DE | 10 2015 016 333 | | 6/2017 | |
| DE | 10 2016 124866 | | 6/2018 | |
| DE | 10 2016 124871 | | 6/2018 | |
| EP | 1 793 271 | | 6/2007 | |
| WO | WO-2016034388 A1 * | | 3/2016 | ............ C09K 11/06 |
| WO | 2016/183483 | | 11/2016 | |

* cited by examiner

ARRANGEMENT FOR ILLUMINATING AND RECORDING A MOVING SCENE

TECHNICAL FIELD

This disclosure relates to an arrangement that illuminates and records a moving scene.

BACKGROUND

There is a need to provide an arrangement that illuminates and records a moving scene so that the moving scene is illuminated and recorded in a particularly energy-saving manner.

SUMMARY

We provide an arrangement that illuminates and records a moving scene, including a light source that illuminates the moving scene, a control device that operates the light source, and a camera that records the moving scene, wherein the light source includes a plurality of pixels, each of which is configured to illuminate an area of the moving scene, the control device is configured to operate the pixels, and the light source includes at least one semiconductor component including at least one semiconductor chip containing two or more of the plurality of pixels.

We also provide a method of operating an arrangement that illuminates and records a moving scene, the arrangement including a light source with a plurality of pixels that illuminate the moving scene, wherein the light source includes at least one semiconductor component including at least one semiconductor chip containing two or more of the plurality of pixels, a control device that operates the light source, and a camera that records the moving scene, including causing each of the pixels to illuminate an area of the moving scene, and causing the control device to operate the pixels.

Figure 1:
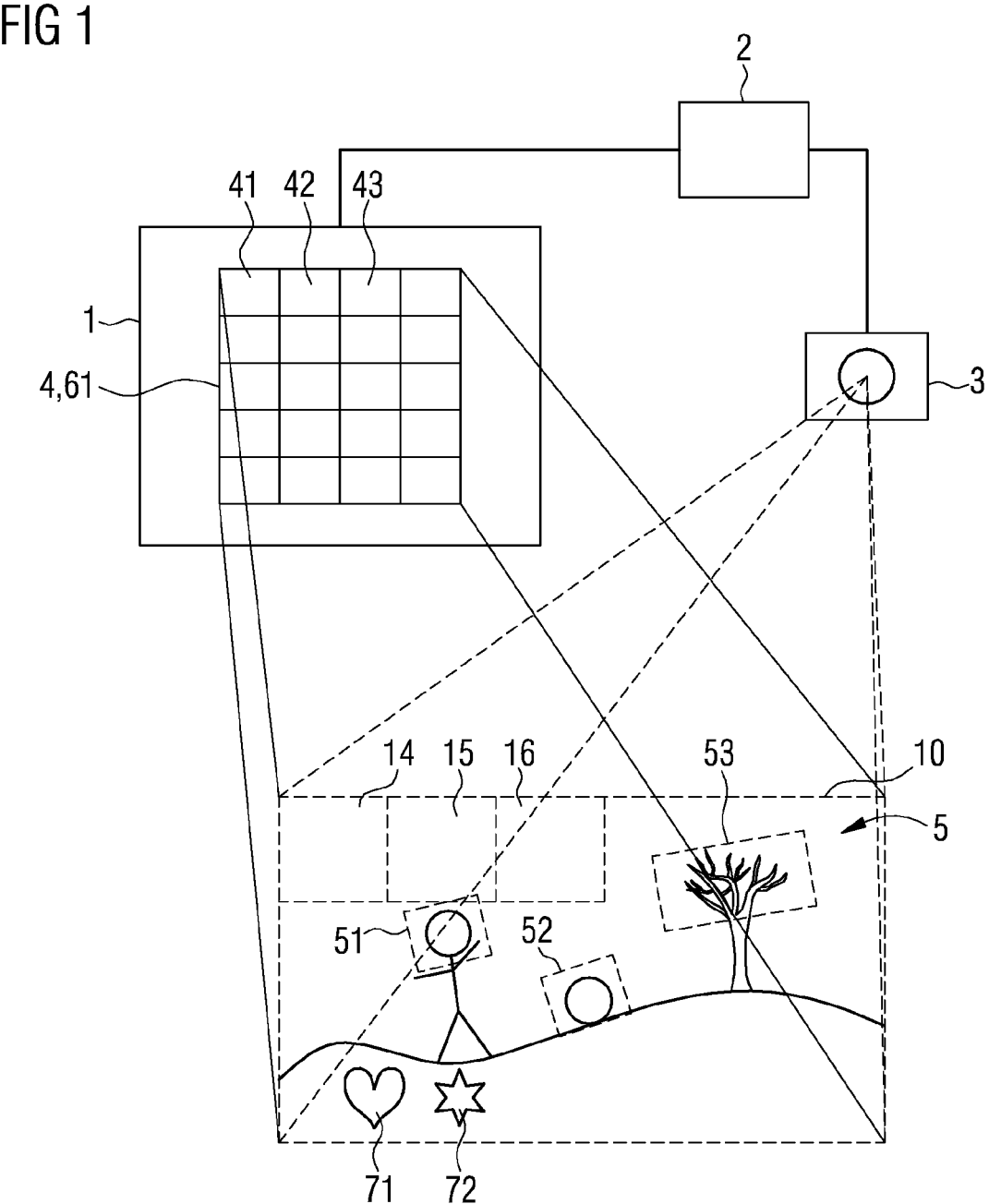
FIG. 1 shows a schematic representation of an example of the arrangement.

LIST OF REFERENCE SIGNS 1 light source
2 control device
10 field of view
14, 15, 16 partial area
20 switch
21 terminal
22 mating terminal
25 intermediate carrier
26 via
27 supply line
3 camera
4 semiconductor component
41, 42, 43 pixel
5 moving scene
51, 52, 53 object
61, 62, 63 semiconductor chip
71, 72 image
8 optical element
81 segment
82 segment
91 converter
92 converter
93 diffuser
10 field of view
90 semiconductor layer sequence
190 active region
191 first semiconductor layer
192 second semiconductor layer
195 recess
197 carrier
711 contact
712 mating contact
721 contact
722 mating contact
731 contact
732 mating contact

DETAILED DESCRIPTION

The arrangement may comprise a light source. The light source is configured to emit light in the spectral range from infrared radiation to UV radiation, in particular visible light, during operation. The light from the light source illuminates a field of view that can be captured by a camera of the arrangement. The field of view of the light source can be congruent with the field of view of the camera. The moving scene to be recorded and illuminated takes place within the field of view. A moving scene is a scene in which at least one object moves relative to the arrangement and thus in particular relative to the light source and relative to a camera of the arrangement. The term "object" broadly means and includes, for example, persons, animals, things and plants.

The arrangement may comprise a control device. The control device is configured to operate the light source. This means that the light source can be energized with the aid of the control device. In addition, the control device may be provided to control and/or regulate the function of the light source. Operation of the light source by the control device depends on parameters that can be set, for example, by a user of the arrangement and/or another element of the arrangement. The other element of the arrangement may be, for example, a brightness sensor, an infrared sensor and/or a device that measures the distance between the arrangement and objects of the moving scene.

The arrangement may comprise a camera that records the moving scene. The camera includes, for example, a CCD (charge-coupled-device) sensor or a CMOS (complementary metal-oxide-semiconductor) sensor that captures individual images of the moving scene, a processing unit that processes the sensor's signals, and a memory unit that records the moving scene, for example, as a video file in an image or video file format. The camera can connect to the control device of the arrangement so that the light source can be controlled depending, for example, on parameters calculated as a function of signals received by the sensor.

The light source may comprise a plurality of pixels. It is possible that the light source consists of one semiconductor component comprising the pixels or that the light source comprises two or more semiconductor components of the same or different type(s), each of which may comprise a plurality of pixels.

The pixels are the radiation-emitting components of the light source. This means that each pixel can produce light of the light source. In particular, the pixels can be operated independently of each other so that it is possible to operate exactly one pixel, several pixels or all pixels of the light source at the same time. Each pixel can be operated at an individual current intensity so that it is possible, for example, that one pixel is operated at the maximum permissible current intensity for that pixel and another pixel is operated at a reduced current intensity. In this way it is possible that the pixels emit light of different brightness, that can result in partial areas of the field of view in the field of view that are illuminated with mutually different illuminance levels. This results in an illuminance distribution in the field of view of the light source that can change both spatially and temporally during recording.

Each pixel may be configured to illuminate an area of the moving scene. This means, for example, that via at least one optical element the light generated in a pixel is projected onto a partial area of the field of view so that each pixel illuminates a certain partial area of the moving scene. In this way, it is possible that the moving scene is not homogeneously illuminated by the light source in terms of the illuminance and color coordinate of the illuminating light, but in particular that illumination can take place in which different partial areas of the scene are illuminated with different illuminance and/or light of different color coordinates.

It is possible that the pixels are part of a single semiconductor component or the light source comprises two or more semiconductor components comprising the pixels. The semiconductor components, in turn, can each comprise one or more semiconductor chips. This means that it is possible in particular that each pixel comprises a single semiconductor chip, for example, a single light-emitting diode chip. Furthermore, it is possible that two, more or all pixels of a semiconductor component are formed by a single semiconductor chip, for example, a single light-emitting diode chip. In this example, the semiconductor chip is a pixelated semiconductor chip structured into separately controllable areas, with each area, for example, forming one pixel.

The control device may be configured to operate the pixels of the light source. This means that the control device allows for the pixels of the light source to be operated individually and independently of each other. In this way, the control device enables the described different illumination of different partial areas of the field of view and thus of different partial areas of the moving scene.

We also provide an arrangement that illuminates and records a moving scene, the arrangement comprising:
a light source that illuminates the moving scene,
a control device that operates the light source, and
a camera that records the moving scene, wherein
the light source comprises a plurality of pixels, each of which is configured to illuminate an area of the moving scene; and
the control device is configured to operate the pixels.

In particular, the arrangement may be part of a mobile electronic device such as a digital camera, a video camera, a mobile telephone, a surveillance camera, a tablet or the like.

An arrangement is based, among other things, on the following considerations: In mobile devices in particular, individual light-emitting diodes are used as flashlights that can also be used for illumination when recording a moving scene, for example, when recording a video. However, such light-emitting diodes are limited in terms of the brightness that can be provided, the color temperature of the light emitted and the field of view that can be illuminated.

An arrangement with a light source comprising a semiconductor component with a plurality of pixels now makes it possible to illuminate individual areas of a moving scene such that illumination with different illuminance and/or light of a different color coordinates can take place in different partial areas. This can, for example, allow for illumination to be rendered as energy-saving as possible since partial areas of the moving scene arranged at a great distance from the arrangement and therefore do not benefit from illumination by the light source can be left out of the illumination.

In particular, it is possible to concentrate the illumination on an object moving relative to the arrangement. Since in this example not all but only some of the pixels of the arrangement have to be operated at the maximum permissible current intensity, such illumination of the moving scene is particularly energy-saving.

In addition, the aging behavior of the light source is improved since the pixels are not operated at certain times while other pixels of the semiconductor component are operated. Overall, this reduces the average operating time of each pixel.

In addition, the arrangement offers the possibility of creating special effects in the moving scene by changing the color coordinate of the emitted light and changing the illuminance in the partial areas, which, for example, improve the aesthetic impression for the viewer of the recorded moving scene.

This is particularly advantageous for animated images or short video sequences that are a mixture of conventional still images and short videos. Moving scenes recorded in this way can, for example, be saved as animated images in the GIF image format.

At least some of the pixels may be configured to emit light of mutually different wavelengths. This means, for example, that the light source comprises two types of pixels, the first type of pixels emitting light in a first wavelength range and the second type of pixels emitting light in a second wavelength range. It is possible that the light source comprises third, fourth and other types of pixels, the pixels of different types emitting light of different wavelengths in pairs.

For example, it is possible for the light source to comprise pixels of the first type that produce cold white light during operation. Cold white light is particularly white light with a color temperature of over 5,000 Kelvin.

It is also possible that the light source comprises pixels of the second type that emit warm white light during operation. Warm white light is particularly white light with a color temperature of at most 3,300 Kelvin.

It is also possible that the light source may comprise pixels of another type that emit colored light during operation such as blue, red and/or green light.

In addition, it is possible that the light source comprises pixels that emit neutral white light, i.e. in particular white light with a color temperature of 3,300 to 5,000 Kelvin.

With such different pixels it is possible to illuminate the moving scene in different partial areas differently with regard to the color coordinate of the illuminating light.

The pixels of different types can be assigned to the same semiconductor component. This means that the semiconductor component then comprises pixels of different types. In addition, the light source may comprise two or more semiconductor components, the semiconductor components differing in the types of pixels they comprise. For example, a semiconductor component may only contain pixels that emit warm white light during operation, whereas another semiconductor component may only contain pixels that emit cold white light during operation.

In both examples, the light source comprises at least one optical element configured to direct the light from pixels of different types into the same partial area of the field of view of the light source. In this way, it is possible to illuminate different partial areas with light of different properties such as different illuminance and/or different color coordinates.

The light source may be configured to illuminate different partial areas of the field of view with light of different illuminance and/or different color coordinates.

The camera comprises a field of view in which it can record an image. For example, the field of view of the camera is congruent with the field of view of the light source. This means that the light source can illuminate the field of view of the camera. The moving scene takes place by moving at least one object relative to the camera within the field of view of the light source. The field of view can be divided into several partial areas, wherein each partial area can be assigned to one or more pixels of the light source. This means that, by operating the assigned pixels of the light source, the relevant partial area of the field of view is illuminated. Since the pixels can be operated separately and different pixels can be configured to emit light of different wavelengths during operation, it is thus possible to illuminate different partial areas of the field of view with light of different illuminance and/or different color coordinates.

The light source may comprise at least one semiconductor component having at least one semiconductor chip comprising two or more of the plurality of pixels. In this example, the light source thus comprises at least one pixelated semiconductor chip in which the pixels are designed as separately controllable luminous areas of the semiconductor chip. In particular, the pixels of such a semiconductor chip are manufactured together on a common growth substrate and comprise an active region in which electromagnetic radiation is generated during operation and has the same composition for all pixels of the semiconductor chip within the manufacturing tolerance. In particular, it is possible that all pixels of the semiconductor chip mechanically and electrically connect to each other via a common, epitaxially produced semiconductor layer. The semiconductor layer can then, for example, be a p-doped or an n-doped semiconductor layer of the semiconductor chip.

With such a pixelated semiconductor chip it is possible to arrange the pixels particularly close to each other since the pixels are not placed individually on a carrier, but are generated by structuring a larger structure, for example, a semiconductor wafer. In this example, the light source can therefore be designed to be particularly space-saving.

The control device may be configured to operate the light source such that a predefinable object in the moving scene is illuminated with a predefinable illuminance and/or with light of a predefined color coordinate. The object can be an object in the broader sense, for example, a person, an animal, a thing, a plant or the like. For example, the object is marked or automatically recognized in the moving scene by a user of the arrangement. The automatic recognition can be carried out, for example, by object recognition that can be integrated in the camera. The object recognition can also be, for example, face recognition. The way in which the object is illuminated in the moving scene with a predefinable illuminance and/or a predefinable color coordinate can also be determined by the user or automatically.

If, for example, the object is a person or the face of a person, the light source can be controlled, inter alia, such that some pixels of the light source form a guide light to illuminate the object at an angle, while other pixels of the light source form a fill light that brightens the moving scene as a whole. The guide light is then the main light having a brightness in a ratio of 2:1, 4:1, 6:1 or 8:1 to the brightness of the fill light. In this way, an impression of a professional illumination of the moving scene by the light source is created that was previously only possible in a professional environment such as TV studios.

The predefinable object may move relative to the camera. This means that the object illuminated with the predefinable illuminance and/or with light of a predefinable color coordinate moves, for example, due to a movement of the camera relative to the stationary object or due to a movement of the object relative to the stationary camera.

The control device may be configured to illuminate the pixels depending on the partial area of the field of view in which the predefined object is located to illuminate the moving predefinable object. In other words, the pixels of the light source are operated such that the partial area of the field of view in which the object is located is illuminated in the predefinable manner. If, for example, the object is located in the field of view relative to the stationary camera, the pixels are operated by the control device such that the predefinable illumination follows the object. This can mean, for example, that a spot-like illumination of the object follows the moving object. In this way, for example, movements in an otherwise stationary image can be highlighted.

This means, for example, that if the moving object moves from a first partial area to a second partial area during the duration of the recording, a pixel assigned to the first partial area is switched off or the current intensity at which it is operated is reduced. In return, a next pixel assigned to the second partial area is switched on or the current intensity at which it is operated is increased.

It is also possible that the object is illuminated with a certain color so that a certain movement in the image can be highlighted by the colored illumination. This means that the given object can be highlighted in the moving image by, for example, a higher illuminance and/or light with a color coordinate clearly different from the color coordinate of the ambient light. In particular, it is also possible to locally and dynamically adjust the correlated color temperature of the light used to illuminate the predefinable object.

The current intensity at which a pixel is operated by the control device may depend on whether the given object is located in a partial area of the scene that can be illuminated by the pixel. In other words, the predefinable illuminance can be adjusted by adjusting the current intensity at which a pixel that illuminates the partial area in which the object is located is operated. The higher the current intensity for the pixel, the greater the illuminance of the predefinable object to be illuminated.

The control device may be configured to operate the light source depending on a material property of the predefined object.

For example, the material property of the predefined object can be a color and/or reflectivity of the object. Furthermore, the material property can be a property of the object in a broader sense such as whether the object is the face of a person.

If, for example, the predefinable object is running water, the light source can be controlled by the control device such that pixels of the light source illuminating the object are pulsed such that short flashes of light are visible to the observer. In this way, for example, the light-reflecting properties of the flowing water can be highlighted.

It is also possible that objects having a dominant color—such as a moving red ball are illuminated with light of a color similar to the dominant color of the object. In the example of the red ball, for example, the ball can be illuminated with red color to emphasize the red color impression of the ball. If the material property of the predefined object is, for example, the fact that the object is a person or the face of a person, warm white light in particular can be used to illuminate the object, giving the person a particularly healthy appearance.

The control device may be configured to operate the light source depending on the duration of the recording. For example, the control device is configured to slowly increase the brightness of the light source at the beginning of the recording and to slowly decrease it towards the end of the recording. This can refer in particular to the illumination of the predefined object. For example, at the beginning of the recording, the object can be slowly faded in by increasing the illuminance at the object and the object can be faded out accordingly at the end of the recording. In general, it is possible that the control device is configured to operate the light source such that an illuminance of the predefined object changes over time.

This means that, according to at least one example, the control device is configured to operate the light source such that the predefinable illuminance and/or the predefinable color coordinate of the light with which the predefinable object is illuminated changes over time. In this way, it is possible, for example, for the illuminance and/or color coordinate of the light used to illuminate certain partial areas of the camera's field of view to change over time. This allows artistic or artificial effects to be created in the recorded moving scene.

The control device may be configured to operate the light source such that a predefinable image is projected into the moving scene. The light source comprises a plurality of pixels. The plurality of pixels makes it possible to create at least simple images such as symbols or pictograms as projections onto surfaces in the field of view of the light source. These images can be projected by the user or automatically into the moving scene so that they are present in the video without any post-processing of the recorded file. In this way, for example, symbols like what is known as emoticons can be inserted into the moving scene.

In the following, the arrangement described here is explained in more detail by examples and the corresponding figures.

Identical, similar or identically acting elements are provided with the same reference signs in the figures. The figures and the proportions of the elements depicted in the figures are not to be regarded as true to scale. Rather, individual elements may be represented exaggeratedly large for better representability and/or better comprehensibility.

The schematic representation of FIG. 1 shows a first example of an arrangement. The arrangement comprises a light source 1. For example, the light source 1 comprises a semiconductor component 4 having exactly one semiconductor chip 61 in the example of FIG. 1. The semiconductor chip 61 is a pixelated semiconductor chip having a plurality of pixels 41, 42, 43. For example, all pixels 41, 42, 43 can emit white light from the same color coordinate range. The light source 1 illuminates a field of view 10 in which a moving scene is taking place.

The arrangement also includes a control device 2 electrically conductively connected to the light source 1. Control device 2 can, for example, comprise a plurality of switches and terminals. The control device 2, for example, is formed by an integrated circuit containing logic, drivers and possibly memory components. The arrangement can alternatively or additionally contain a microprocessor or a microcontroller on which the data are processed.

The control device 2 is configured to operate the light source 1. In particular, the control device 2 is configured to operate the pixels 41, 42, 43 of the light source 1. The pixels 41, 42, 43 can be operated independently of each other by the control device 2. The control device 2 can, for example, specify the current intensity at which each pixel 41, 42, 43 is operated. Alternatively, the information as to which current intensity should be applied to which pixel can be evaluated, for example, in the above-mentioned microprocessor or microcontroller and then be communicated to the control device 2.

The arrangement also includes a camera 3. The camera 3 is configured to record a moving scene 5. The camera 3 can also be configured to record still scenes, i.e. images. The camera 3 includes a field of view congruent with the field of view 10 of the light source 1 and in which the moving scene 5 to be recorded by the camera 3 takes place.

In the example shown in FIG. 1, the camera 3 also connects to the control device 2. This means that via the control device 2 it is also possible to operate the light source 1 depending on signals received by the camera 3. In this way, functions integrated in the camera 3 can also be used to operate the light source 1. Such functions may include face recognition, object recognition, motion detection and/or distance determination between an object 51, 52, 53 and the camera 3. These functions can also be integrated in a microprocessor, which is, for example, part of the component (for example, the mobile phone) in which the camera is integrated.

In addition, the arrangement may include other devices and sensors not shown in FIG. 1 and are configured to generate signals processed by the control device 2 to operate the light source 1.

With the pixels 41, 42, 43 it is possible to illuminate partial areas 14, 15, 16 in the field of view 10. The light source is configured to illuminate the different partial areas 14, 15, 16 of the field of view 10 with light of different illuminance and/or different color coordinates. For example, the semiconductor component 4 comprises 8×8 pixels arranged matrix-like at the nodes of a rectangular grid. At an object distance of one meter, a partial area 14, 15, 16 assigned to a pixel 41, 42, 43 has, for example, an edge length of 20 to 30 cm. This means that the 8×8 pixels can illuminate an area of view 10 at a distance of one meter which then has an edge length of 1.60 meters to 2.40 meters.

During operation of the arrangement, the control device 2 is now configured to operate the light source 1 such that a predefinable object 51, 52, 53 in the moving scene 5 is illuminated with a predefinable illuminance and/or with light of a predefinable color coordinate. The objects 51, 52, 53 can be people, a ball and a tree, for example. The user or an algorithm can now select one of these objects, some of the objects or all of the objects to be illuminated with a predefinable illuminance and/or with light of a predefinable color coordinate. For example, a person, object 51, can be illuminated in the area of their face with light of a particularly low color temperature. The other object 52, a moving ball, for example, can be illuminated with a particularly high illuminance to highlight it in the moving scene 5. The other object 53, in this example a tree, can, for example, be illuminated with greenish light to emphasize the green color impression of the leaves of the tree in the recorded scene.

In particular, it is possible that at least one of the objects 51, 52, 53 moves relative to the camera and the control device is configured to operate the pixels 41, 42, 43 to illuminate the moving predefinable object 51, 52, 53 depending on the partial area 14, 15, 16 in which the predefinable object 51, 52, 53 is located.

In addition, the control device 2 can be configured to operate the light source such that the predefinable illuminance and/or the predefinable color coordinates change over time. In this way, for example, one of the objects 51, 52, 53 can be faded in or out of the image by changing the illuminance. For example, the illuminance at object 51, in the example of FIG. 1 a person, can first be slowly increased for a certain period of time and then kept constant. In this way, object 51 is faded into the moving scene, i.e. the visibility for the viewer increases for object 51 over time.

Finally, FIG. 1 shows that the control device is configured to operate the light source such that a predefinable image is projected into the moving scene 5. In the example of FIG. 1, the images 71, 72 are faded into the scene at least temporarily. The images 71, 72 are simple pictograms or what is known as emoticons, for example. The time of the fade-in as well as the design of the faded-in image 71, 72 can be defined by the user or automatically, for example, by the control device.

Figure 2:
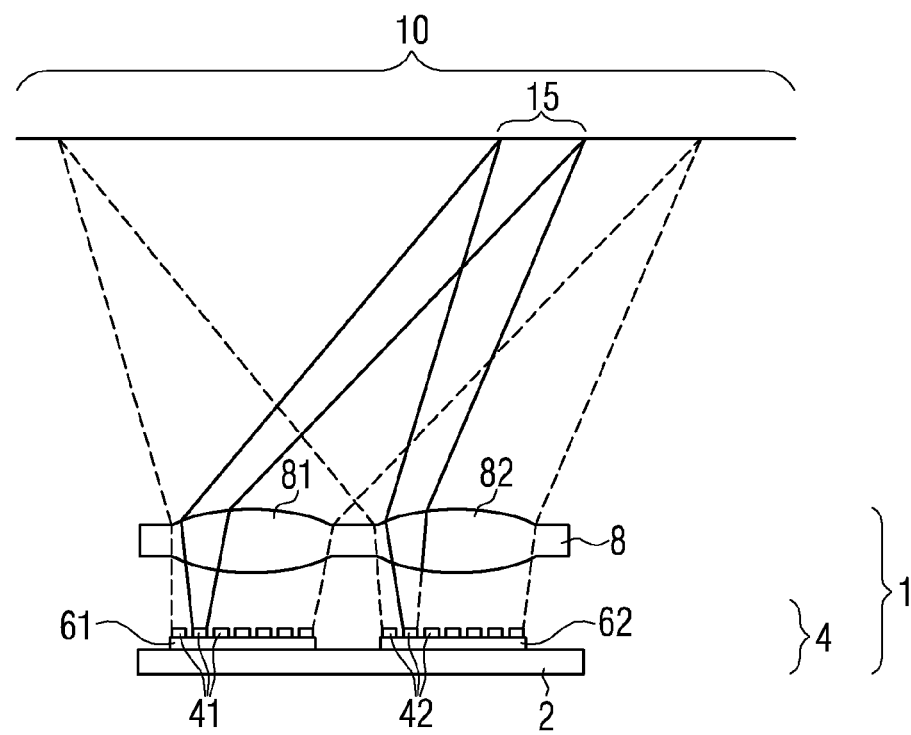
FIGS. 2, 3A, 3B, 3C show schematic representations of further examples of the arrangements.

FIG. 2 shows an example of a light source 1 that can be used in an example of an arrangement. In contrast to the example shown in FIG. 1, the light source 1 here comprises a semiconductor component 1 with at least two semiconductor chips 61, 62, each of which comprises a plurality of pixels 41, 42. The radiation emitted during operation of the light source 1 is directed by an optical element 8 into a field of view 10 to be illuminated.

The light source 1 comprises a plurality of pixels 41 of a first type. The pixels 41 of the first type are arranged in a first matrix arrangement, i.e. at the nodes of a rectangular grid, of the first semiconductor chip 61. The light source 1 further comprises a plurality of pixels 42 of a second type, the pixels 42 of the second type being arranged in a second matrix arrangement of the second semiconductor chip 62. The pixels 41 of the first type and the pixels 42 of the second type are different with regard to their radiation, in particular their spectral radiation. For example, the pixels 41 of the first type emit light that appears warm white to the human eye and the pixels 42 of the second type emit light that appears cold white to the human eye.

The first semiconductor chip 61 and the second semiconductor chip 62 are arranged next to each other in a lateral direction. The lateral directions are those directions parallel to a main extension plane of the semiconductor chips 61, 62. In a top view of the semiconductor component 4, the semiconductor chips 61, 62 are arranged next to each other without overlapping.

The optical element 8 has a plurality of segments 81, wherein each semiconductor chip 61, 62 is assigned one segment unambiguously, for example. The segments 81 of the optical element 8 are formed such that one pixel 42 of the second semiconductor chip is assigned to each pixel 41 of the first semiconductor chip 61 so that the radiation emitted by these pixels overlaps in the field of view 10 in a partial area 15, in particular congruently or substantially congruently.

This is shown in FIG. 2 by the dotted lines schematically indicating a beam path from one pixel 41 of the first semiconductor chip 61 and one pixel 42 of the second semiconductor chip 62, respectively, through the associated segment 81 of the optical element 8 and define the partial area 15 in the field of view 10. However, these beam paths only explain the functional principle and do not represent precise beam paths in the sense of geometric optics.

In FIG. 2, the segments 81 have a convex shape both on a side facing the semiconductor component 4 and on a side facing away from the semiconductor component 4. However, the optical element 8 can also be designed differently, for example, in the form of a Fresnel lens for each segment.

Optical elements by which a superposition of assigned pixels in a partial area of a field of view can be achieved are described in DE 10 2016 124 871.1 and 10 2016 124 866.5, the entirety of the subject matter of which is incorporated herein by reference.

By a variation of the current ratio between the pixel 41 of the first type and the associated pixel 42 of the second type, the color coordinate in the partial area 15 of the field of view 10 illuminated by these pixels can be adjusted during operation of the light source 1. The variation of the current ratios is carried out by the control device 2 that can also form a carrier for the semiconductor chips 61, 62.

The number of pixels 41, 42 can be varied within wide limits. For example, the light source comprises between and including 10 and 1000 pixels 41 of the first type. The number of pixels 41 of the first type is preferably equal to the number of pixels 42 of the second type.

Figure 3A:
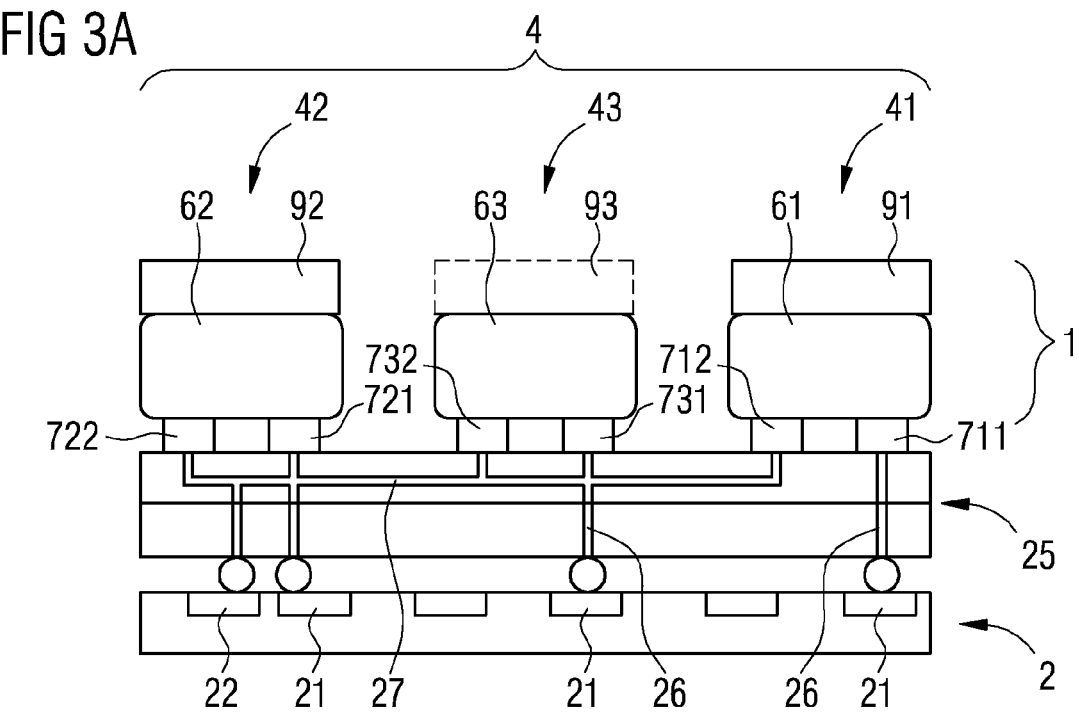

FIG. 3A shows a schematic sectional view of a light source 1 with a control device 2 for an example of an arrangement.

In this example, the light source 1 comprises pixels 41, 42 and 43, each comprising a separate semiconductor chip 61, 62, 63 arranged laterally next to each other.

The pixels 41, 42, 43 may each have semiconductor chips 61, 62, 63 of the same type so that the pixels 41, 42, 43 differ from each other only by the converter 91, 92 applied or not applied to the semiconductor chips.

For example, the semiconductor chips 61, 62, 63 each emit radiation in the blue spectral range. The first converter 91 partially converts this radiation into radiation in the yellow, green and/or red spectral range so that the pixels 41 of the first type emit mixed light that appears warm white or correspondingly colored light.

In contrast, the second converter 92 is designed such that the total radiation emitted by the pixels 42 of the second type appears cold white or in a different color than the light of the pixels 41 of the first type.

Third type pixels 43 can emit blue light, unconverted light.

For example, a thickness of the converters 91, 92 is 40 µm to 100 µm, and in particular 60 µm to 80 µm. This results in smoother transitions in the field of view 10 between the partial areas to be illuminated 14, 15, 16 than with a thinner radiation conversion element. The converters therefore not only determine the color coordinate of the emitted radiation, but also influence the spatial radiation characteristics. If a similar effect is desired for the light of the pixels 43 of the third type, a non-converting diffuser 93 can be arranged downstream thereof.

However, the pixels 41, 42, 43 can also be free of converters and diffusers and be formed using different semiconductor materials. For example, semiconductor chips based on an arsenide compound semiconductor material are suitable to generate radiation in the red spectral range. By contrast, semiconductor chips based on a nitride compound semiconductor material are suitable to generate radiation in the blue or green spectral range.

By designing the pixels that are different with regard to their radiation emission as separate semiconductor chips, the appropriate semiconductor material can be selected for the respective radiation generation. Such an arrangement can therefore be characterized by a particularly high efficiency of radiation generation.

It is also possible that the individual semiconductor chips 61, 62, 63 each form more than one pixel 41, 42, 43. For example, in the example shown in FIG. 3A, the first semiconductor chip 61 alone forms a column of first type pixels 41.

The total number of semiconductor chips to be placed can thus be reduced.

For an electrically conductive connection between the first semiconductor chips 61, the second semiconductor chips 62 and the third semiconductor chips 63, the semiconductor chips can be arranged next to each other in a lateral direction on an intermediate carrier 25. The intermediate carrier 25 simplifies electrical contacting between the semiconductor chips and the control device 2. For example, a first contact 711 of the first semiconductor chip 61, a first contact 721 of the second semiconductor chip 62 and a first contact 731 of the third semiconductor chip 63 each electrically connect to a terminal 21 of the control device 2. A mating contact 712 of the first semiconductor chip, a mating contact 722 of the second semiconductor chip and a mating contact 732 of the third semiconductor chip electrically conductively connect to a common mating terminal 22 of the control device 2. The electrical contact within the intermediate carrier 25 is established, for example, via supply lines 27 on or in the intermediate carrier. These supply lines extend vertically through vias 26 to the control device 2 so that the control device 2 can be arranged directly below the semiconductor chips 61, 62, 63 intended for radiation generation and forms a mechanical support for the intermediate carrier 25 and the pixels 41, 42, 43.

Figure 3B:
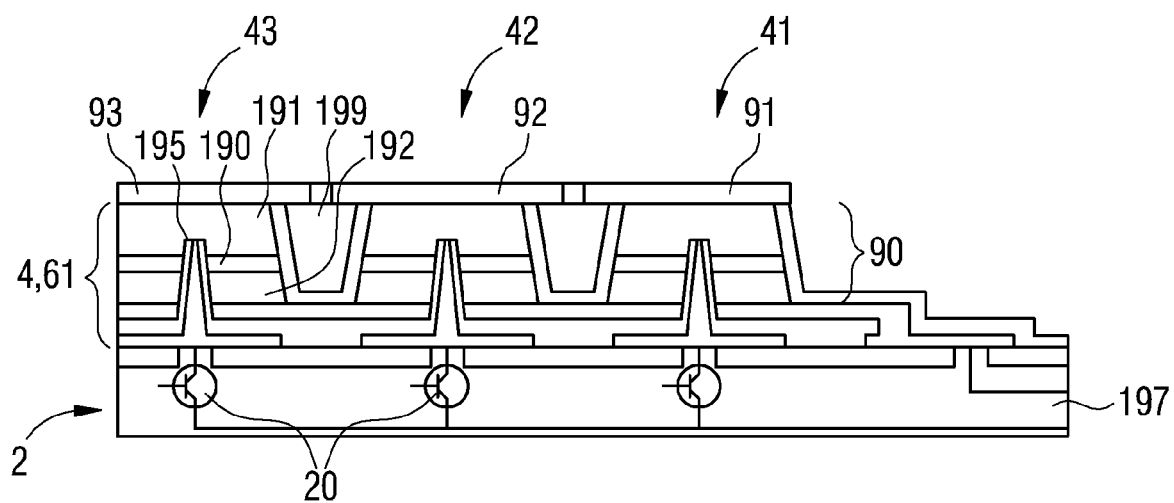

Deviating from this, however, the control device 2 can also be arranged spatially separated from the light source 1 and connect to it in an electrically conductive manner FIG. 3B shows an example of a semiconductor component 4 in which several pixels 41, 42, 43 are integrated in a common semiconductor chip 61. For example, several pixels of one type are integrated in a common semiconductor chip. Furthermore, pixels of different types such as first type pixels and second type and third type pixels, can be integrated in a common semiconductor chip.

The semiconductor chip has an in particular epitaxially deposited semiconductor layer sequence 90 with an active region 190 provided to generate radiation, wherein the active region 190 is arranged between a first semiconductor layer 191 of a first conductivity type, for example, n-conductive, in a second semiconductor layer 192 of a second conductivity type, for example, p-conductive, different from the first conductivity type.

The individual pixels 41, 42, 43, in particular the active regions of these pixels, each arise from a partial area of the semiconductor layer sequence 90.

In particular, these partial areas arise from the same semiconductor layer sequence 90 during production of the semiconductor chip 61 so that the semiconductor layers of the individual pixels do not differ with regard to their material and layer thickness, apart from production-related lateral fluctuations.

The individual pixels are separated from each other by spaces 199. The spaces 199 in particular cut through the active regions 190 of adjacent pixels.

The semiconductor layer sequence 90 is arranged on a carrier 197. The carrier also mechanically stabilizes the semiconductor layer sequence 90 so that a growth substrate for the semiconductor layer sequence is no longer required for this purpose and can therefore be removed. This means that the semiconductor chip 61 can be free of a growth substrate.

A control device 2 with a plurality of switches 20 is arranged in the carrier 197. One switch 20 is assigned to each pixel so that the individual pixels can be operated independently of one another during operation of the illuminating device.

The first semiconductor layer 191 arranged on the side of the active region 190 facing away from the carrier 197 electrically conductively connects to an associated switch 20 by recesses 195. The second semiconductor layers 192 of the pixels electrically connect to each other and can be at the same electrical potential during operation of the light source 1. Both sides of the active region 190 are thus accessible for electrical contacting from the side facing the carrier 197. The electrical contacting of the individual pixels can be varied within wide limits as long as the individual pixels are individually controllable and during operation of the semiconductor component 4 charge carriers from opposite sides reach the active region 190 and can recombine there under emission of radiation.

On the side of the semiconductor layer sequence 90 facing away from the carrier 197, the pixels 41 of the first type, the pixels 42 of the second type and the pixels 43 of the third type are each assigned a first converter 91, a second converter 92 and optionally a diffuser 93. The converters 92, 92 and the diffuser 93 can be designed as described in connection with FIG. 2.

Figure 3C:
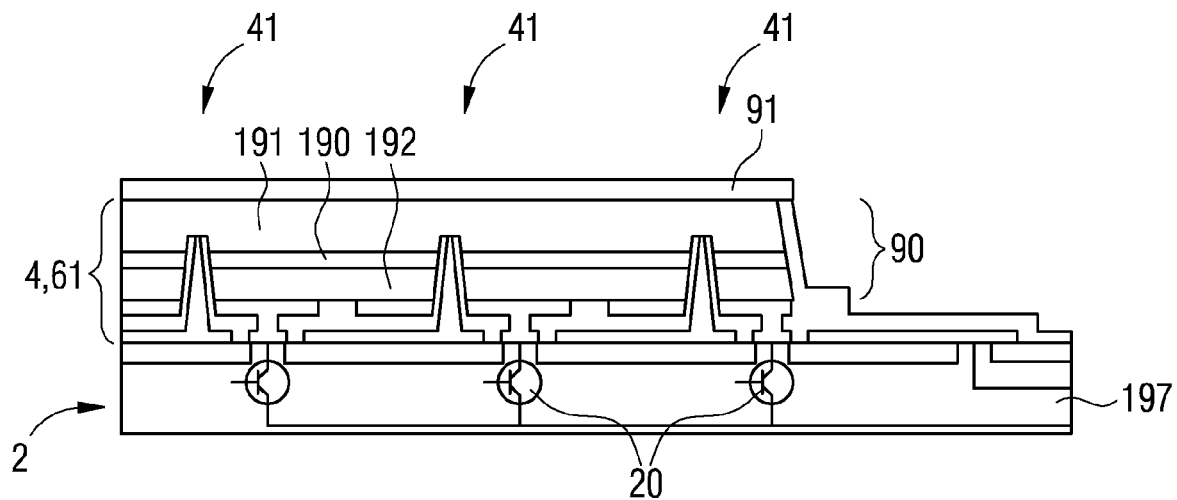

The example for a semiconductor component 4 described in FIG. 3C is essentially the same as the example described in connection with FIG. 3B. In contrast to the latter, a common converter 91 extends over the semiconductor chip 61. The semiconductor chip 61 forms a plurality of pixels of the same type, for example, a plurality of pixels 41 of the first type. Such a common converter 91 for forming pixels 41 of the same type can also be used in the example described in connection with FIG. 3B.

Furthermore, the semiconductor layer sequence 90 in the example shown in FIG. 3C is not cut between adjacent pixels 41 of the first type. The spatial separation between adjacent pixels is mainly due to the lateral current expansion during electrical contacting of the individual pixels. In the example shown, the spatial expansion of the electrical connection to the second semiconductor layer 192 determines the lateral expansion of the radiation emission of a pixel 41 of the first type.

This results in smooth transitions between the individual pixels 41. When such a light source is used to illuminate a moving scene 5, the risk of excessively sharp transitions occurring between those partial areas 14, 15, 16 of the field of view 10 to be illuminated to different degrees is thus reduced, which could make images taken under such lighting appear unnatural.

Further examples of semiconductor chips with individually controllable pixels are described in U.S. Pat. Nos. 9,362,335 and 9,192,021, each in a different context, the entire subject matter of each of which is incorporated herein by reference.

We surprisingly found that the basic design and electrical contacting of individual pixels in a common semiconductor chip for an illuminating device is suitable for use in a flashlight.

Figure 4:
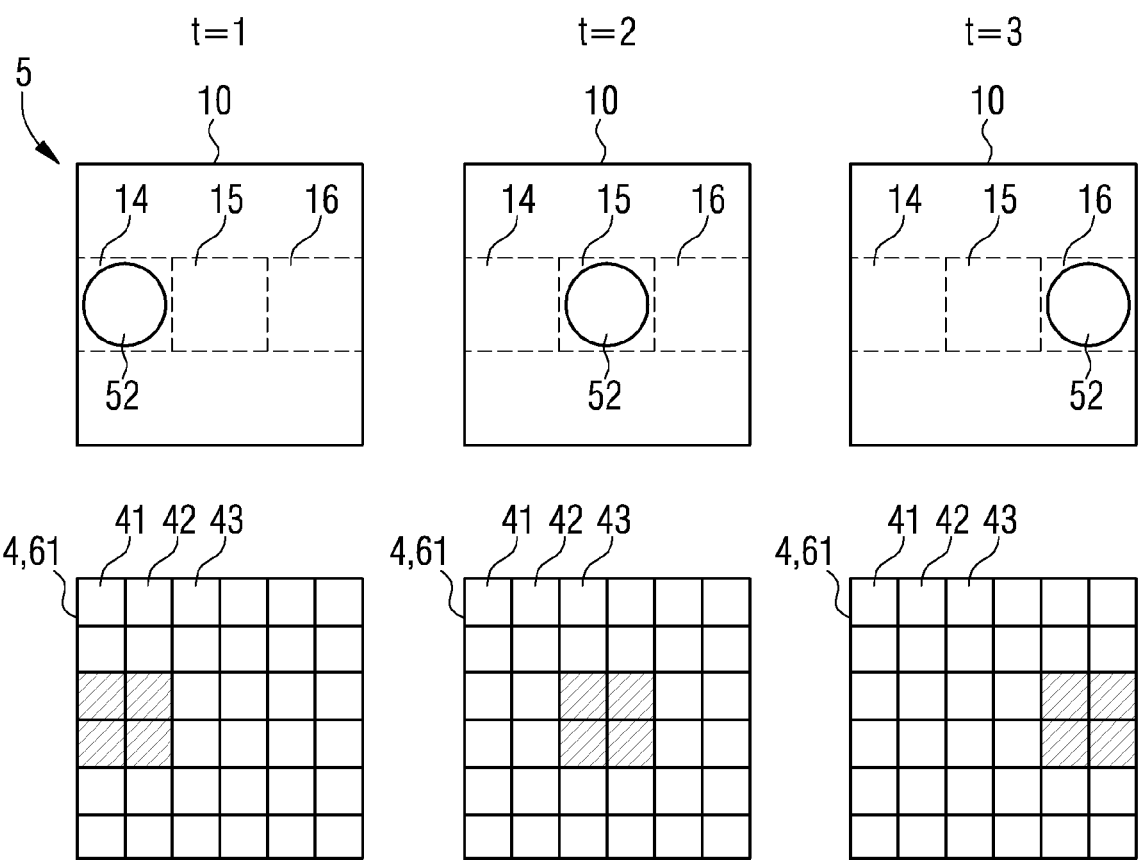
FIG. 4 shows an example of using an arrangement to illustrate an example of an arrangement.

In connection with FIG. 4, an operating method for an arrangement is explained in more detail according to an example of an arrangement. For illuminating a moving predefinable object 52, in this example, a ball, the control device 2 is configured to operate the pixels 41, 42, 43 of the light source 1 depending on the partial area 14, 15, 16 in which the predefinable object 51, 52, 53 is located. For example, at time t=1 the object is located in partial area 14, which is illuminated by the hatched pixels. In a subsequent time period t=2, the object 52 is located in partial area 15 illuminated by other pixels of the light source. Finally, the object 52 is located at time t=3 in partial area 16, which in turn is illuminated by further pixels of the light source. This means that the movement of the object can be traced, for example, by operating the corresponding pixels that illuminate the associated partial areas. It is possible that the light source is operated as a spotlight by energizing only those pixels assigned to the partial area in which the moving object is located. Alternatively, it is possible that those pixels that illuminate the partial area in which the object is located are operated at a higher current intensity than surrounding pixels. In this way, the light source 1 is operated to generate a guide light following the moving object 5 and a fill light contributing to the brightening of the entire scene 5 in the field of view 10.

Our arrangements and methods are not limited to the examples by the description using these examples. Rather, this disclosure includes any new feature and any combination of features that in particular includes any combination of features in the appended claims, even if the feature or combination itself is not explicitly mentioned in the claims or examples.

Priority of DE 102017103886.8 is claimed, the subject matter of which is incorporated herein by reference.

The invention claimed is:

1. An arrangement that illuminates and records a moving scene, comprising:
a light source that illuminates the moving scene,
a control device that operates the light source,
an optical element, and
a camera that records the moving scene, wherein
the light source comprises a plurality of pixels, each of which is configured to illuminate an area of the moving scene,
the control device is configured to operate the pixels,
the light source comprises at least one semiconductor component comprising at least two pixelated semiconductor chips,
the at least two pixelated semiconductor chips each comprise a semiconductor layer sequence and two or more pixels of the semiconductor chip are formed of partial areas arising from a same semiconductor layer sequence,
the at least two pixelated semiconductor chips are arranged next to each other in a lateral direction,
one pixelated semiconductor chip comprises first pixels and another pixelated semiconductor chip comprises second pixels,
the first pixels and the second pixels are different with regard to emitted radiation,
the optical element has a plurality of segments, wherein each semiconductor chip is assigned one segment, and
the segments of the optical element are formed such that to each first pixel a second pixel is assigned, such that the emitted radiation from the first pixels and the second pixels overlap in a field of view.

2. The arrangement according to claim 1, wherein at least some of the pixels are configured to emit light of mutually different wavelengths.

3. The arrangement according to claim 1, wherein the light source is configured to illuminate different partial areas of a field of view with light of different illuminance and/or different color coordinates.

4. The arrangement according to claim 3, wherein the control device is configured to operate the light source such that the predefinable illuminance and/or the predefinable color coordinate change over time.

5. The arrangement according to claim 1, wherein the light source comprises exactly one semiconductor component comprising exactly one semiconductor chip comprising the plurality of pixels.

6. The arrangement according to claim 1, wherein the light source comprises a semiconductor component comprising a semiconductor chip comprising a portion of the plurality of pixels that emit warm white light during operation and another semiconductor chip comprising a portion of the plurality of pixels that emit cold white light during operation.

7. The arrangement according to claim 1, wherein the control device is configured to operate the light source such that a predefinable object in the moving scene is illuminated with a predefinable illuminance and/or with light of a predefinable color coordinate.

8. The arrangement according to claim 7, wherein the predefinable object moves relative to the camera.

9. The arrangement according to claim 8, wherein the control device is configured to operate the pixels depending on the partial areas in which the predefinable object is located to illuminate the moving predefinable object.

10. The arrangement according to claim 9, wherein a current intensity at which a pixel is operated by the control device depends on whether the predefinable object is located in a partial area of the scene illuminable by the pixel.

11. The arrangement according to claim 1, wherein, for a predefinable object moving from a first partial area to a second partial area, the control device is configured to switch off a pixel assigned to the first partial area or reduce a current intensity at which it is operated as soon as the predefinable object leaves the first partial area, and the control device is configured to switch on another pixel assigned to the second partial area or increase the current intensity at which the second pixel is operated as soon as the predefinable object is located in the second partial area.

12. The arrangement according to claim 11, wherein the control device is configured to operate the light source depending on a material property of the predefinable object.

13. The arrangement according to claim 1, wherein the control device is configured to operate the light source depending on the duration of the recording.

14. The arrangement according to claim 1, wherein the control device is configured to operate the light source such that a predefinable image is projected into the moving scene.

15. The arrangement according to claim 1, wherein the semiconductor layer sequence comprises a first semiconductor layer, a second semiconductor layer and an active region, and the semiconductor layer sequence is electrically contacted and the pixels are defined by electrical connections to the semiconductor layer.

16. The arrangement according to claim 1, wherein the semiconductor layer sequence comprises a first semiconductor layer, a second semiconductor layer and an active region, and the pixels are defined by spaces cutting through an active region.

17. A method of operating an arrangement that illuminates and records a moving scene, the arrangement comprising:

a light source with a plurality of pixels that illuminate the moving scene, wherein the light source comprises at least one semiconductor component comprising at least one pixelated semiconductor chip, wherein the at least one pixelated semiconductor chip comprises a semiconductor layer sequence and two or more pixels of the semiconductor chip are formed of partial areas arising from a same semiconductor layer sequence, a control device that operates the light source, and a camera that records the moving scene, comprising:
causing each of the pixels to illuminate an area of the moving scene, and
causing the control device to operate the pixels, wherein, for a predefinable object moving from a first partial area to a second partial area, the control device switches off a pixel assigned to the first partial area or reduces a current intensity at which it is operated as soon as the predefinable object leaves the first partial area, and the control device switches on another pixel assigned to the second partial area or increases the current intensity at which the second pixel is operated as soon as the predefinable object is located in the second partial area, the control device operates the light source depending on a material property of the predefinable object, the material property is highlighted by operation of the light source, and the material property of the predefinable object is a color and/or a reflectivity of the object.

18. The method according to claim 17, wherein, for a predefinable object that moves from a first partial area to a second partial area, the control device switches off a pixel assigned to the first partial area or reduces a current intensity at which it is operated as soon as the predefinable object leaves the first partial area, and the control device switches on another pixel assigned to the second partial area or increases the current intensity at which the second pixel is operated as soon as the predefinable object is located in the second partial area.

19. The method according to claim 18, wherein the control device operates the light source depending on a material property of the predefinable object.

20. The method according to claim 17, wherein the control device operates the light source depending on the duration of the recording.

21. The method according to claim 17, wherein a predefinable illuminance and/or a predefinable color coordinate change over time.

22. The method according to claim 17, wherein a predefinable image is projected into the moving scene by the light source.

23. An arrangement that illuminates and records a moving scene, comprising:
a light source that illuminates the moving scene,
a control device that operates the light source, and
a camera that records the moving scene, wherein
the light source comprises a plurality of pixels, each of which is configured to illuminate an area of the moving scene,
the control device is configured to operate the pixels,
the light source comprises at least one semiconductor component comprising at least one semiconductor chip comprising two or more of the plurality of pixels,
each pixel of the plurality of pixels is part of one of the at least one semiconductor chip,
the control device is configured to operate the light source such that a predefinable image is projected into the moving scene by the plurality of pixels, and
the plurality of pixels makes it possible to create at least simple images.

* * * * *